Dec. 28, 1926.
H. A. ANDERSON
1,611,870
ACOUSTIC APPARATUS
Filed July 30, 1924
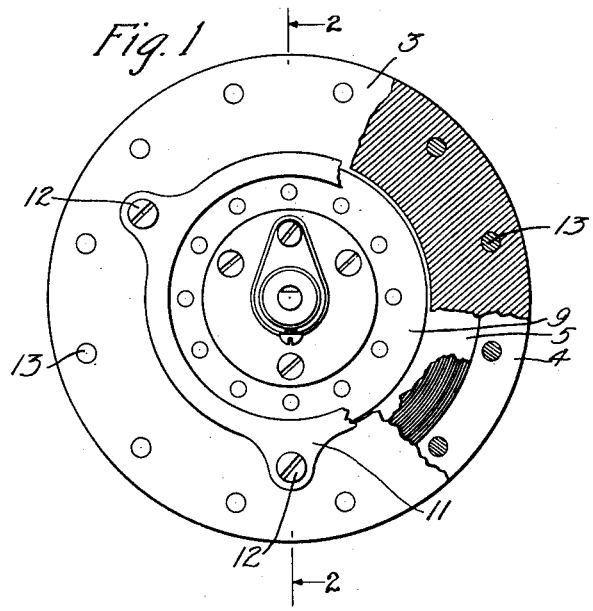
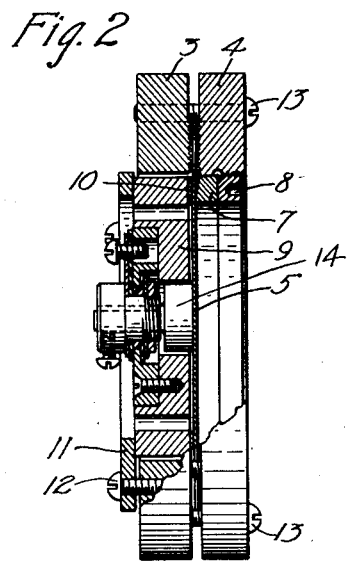
Inventor:
Harvey A. Anderson,
by ~~~~~ Atty

Patented Dec. 28, 1926.

1,611,870

UNITED STATES PATENT OFFICE.

HARVEY A. ANDERSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

ACOUSTIC APPARATUS.

Application filed July 30, 1924. Serial No. 728,996.

This invention relates to acoustic devices employing stretched diaphragms and has for its object improving the efficiency of such devices.

In accordance with the general features of the invention, there is provided a light diaphragm made of corrosion resistant material having a ratio of tensile strength to density comparable to that of spring steel. In its preferred embodiment, the diaphragm is made of an aluminum alloy, such as duralumin, having a thickness of approximately .0017" and tuned by stretching it to a period of about 6000 cycles per second.

Heretofore spring steel was regarded as the most satisfactory material and was the one most commonly used for stretched diaphragms, but such grades of steel as are suitable for this purpose cannot be rolled below approximately .003" in thickness. Stretching diaphragms of this thickness to the required frequency, about 6000 cycles per second, introduces very high tensile stresses in the diaphragm, raises the stiffness accordingly by an undesirable amount and incidentally requires massive clamping means to securely hold it while under stress.

Experiments have shown that duralumin posseses many of the advantages of steel and apparently none of its disadvantages. Both materials have substantially the same strength-weight ratio, since suitable steel has a tensile strength of 230,000 lbs. per square inch and a density of 7.85 and duralumin a tensile strength of 80,000 lbs. per square inch and a density of 2.8. The strength-weight ratio may be defined as the tensile strength divided by 1000 times the density. For steel and duralumin it is approximately 30. Diaphragms of steel and duralumin of the same diameter and the same weight will have approximately the same tensile strength. A duralumin diaphragm of approximately .008" in thickness requires approximately the same tension to tune it to a given frequency as a steel diaphragm approximately .003" in thickness which is the minimum thickness to which the steel in grades suitable for diaphragms may be rolled.

However, it is possible to roll duralumin to a thickness of 0.0017" and thereby effect a large reduction in mass. The tension required to raise a duralumin diaphragm of this thickness to the required frequency is about ⅕ that necessary to raise one of steel .003" in thickness to the same frequency. With this reduction in tension and mass but ⅕ of the force is required to give the same displacement, or the same force will increase the displacement about five fold, since the force required to produce a given displacement of the order of magnitude common in acoustic devices is inversely proportional to the tension.

The voltage developed in a transmitter is approximately proportional to the amplitude of the motion of the diaphragm and the output is proportional to the square of the voltage. Therefore, under the same operating conditions, the transmitter employing a duralumin diaphragm .0017" in thickness will deliver 25 times the energy to an output circuit of given impedance that one having a steel diaphragm .003" in thickness will deliver. This increase in output energy represents a gain in efficiency of about 15 miles of standard Number 19 B. and S. gauge cable. This explains the great improvement in the efficiency of high quality transmitters which has actually been accomplished by the use of diaphragms in accordance with the invention. They also serve to improve the quality of transmission when carbon type transmitters are used since it is possible to obtain the same output with 15 miles less amplification and the ratio of sound output to carbon noise is increased, since carbon noise varies but little with the diaphragm displacement.

Owing to the thinness of the duralumin diaphragm, it is preferred to use clamping rings of the same material, or at least to provide washers of the same material on each side of the diaphragm, in order to prevent electrolytic action, which usually takes place between dissimilar metals. Commercial duralumin contains approximately 95% aluminum, 3.5% to 6% copper, .5% to .8% manganese, .5% to 1% magnesium, .2% to .4% silicon.

Referring to the drawing, Fig. 1 is a rear view partly in section of a transmitter embodying the invention. Fig. 2 is a cross-sectional view on the line 2—2.

Between the rings 3 and 4, the diaphragm 5 is securely clamped by means of screws 13. The diaphragm 5 is stretched to its desired frequency by screwing against it a ring 7 threaded to the inner surface of the clamping ring 4 and held in place by the locknut 8. An air-damping plate 9, is disposed against the back of the diaphragm and secured in place by means of the member 11, which is fastened to the clamping ring 3 by means of screws 12. A thin washer 10 is disposed between the air damping plate 9 and the diaphragm 5 to provide the necessary air space. Preferably, the clamping rings 3 and 4, the washer 10 and the tensioning ring 7 are made of duralumin. A suitable carbon-containing chamber 14 is supported in an aperture in the damping plate 9, and insulated therefrom in any well-known manner.

The particular transmitter shown merely illustrates one form of transmitter employing stretched diaphragms for which the diaphragm is particularly well suited. It may be used to advantage in any of the well-known transmitters employing any suitable clamping and stretching schemes.

Since duralumin diaphragms having a thickness .0017" require considerably less tension to raise them to the desired frequency the clamping means may be made less massive than that for steel, thereby reducing the weight of the instrument and incidentally its cost. Since it is also a corrosion resistant material replacements are minimized thereby reducing the cost of maintenance.

What is claimed is:

1. In an acoustic device, a stretched diaphragm of duralumin.

2. In an acoustic device, a stretched diaphragm of a light metallic alloy having a density less than three combined with a tensile strength in excess of fifty-thousand pounds per square inch.

3. In an acoustic device, a stretched diaphragm of an aluminum alloy having not less than 3.5% copper and not more than 1% magnesium.

4. In an acoustic device, a diaphragm and stretching means therefor, said diaphragm being of an aluminum alloy having a tensile strength approximately as great as that of a steel diaphragm of equivalent mass.

5. In an acoustic device, a diaphragm and stretching means therefor, said diaphragm being aluminum alloy having a thickness not greater than .008" and capable of being stretched to a period of not less than 5,000 cycles per second.

6. In an acoustic device, a diaphragm and stretching means therefor, said diaphragm being of aluminum alloy comprising not more than 6% copper and having a specific gravity less than 3.

7. In an acoustic device, a diaphragm and stretching means therefor including an annular member of duralumin in contact with said diaphragm.

8. In an acoustic device, a diaphragm, a pair of annular members between which said diaphragm is clamped and means whereby said diaphragm may be stretched to a high natural period, said diaphragm, said clamping means and said stretching means being made of a material having the physical characteristics of duralumin.

9. In an acoustic device, a diaphragm of duralumin and stretching means therefor, said diaphragm having a thickness of approximately .0017".

10. In an acoustic device, a diaphragm of a material having a ratio of strength to weight of about 30 and capable of being rolled to a thickness less than .002".

11. In an acoustic device, a diaphragm of a material having an elastic resilience about 2/3 that of steel when compared on a basis of equal weights of material and capable of being rolled to thicknesses one-half the minimum obtainable with steel.

12. In an acoustic device a diaphragm of corrosion resistant material having the strength-weight ratio of approximately 30.

In witness whereof, I hereunto subscribe my name this 22 day of July, A. D. 1924.

HARVEY A. ANDERSON.